(12) United States Patent
Gehret

(10) Patent No.: US 6,217,689 B1
(45) Date of Patent: *Apr. 17, 2001

(54) APPARATUS AND METHOD FOR MANUFACTURING PACKING MATERIAL

(75) Inventor: Joseph B. Gehret, Montoursville, PA (US)

(73) Assignee: Norcen Industries, Jersey Shore, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/093,767

(22) Filed: Jun. 9, 1998

(51) Int. Cl.[7] .............................. B32B 31/26; B63B 25/24
(52) U.S. Cl. ......................... 156/147; 156/156; 156/203; 156/218; 156/292; 156/308.4; 156/466
(58) Field of Search .................................. 156/147, 156, 156/203, 217, 218, 227, 292, 308.4, 442.1, 465, 466

(56) References Cited

U.S. PATENT DOCUMENTS

| | | |
|---|---|---|
| 2,265,075 | 12/1941 | Knuetter . |
| 2,529,732 | 11/1950 | Howard . |
| 3,004,881 | 10/1961 | Van Der Meulen . |
| 3,900,346 * | 8/1975 | Koch et al. .......................... 156/145 |
| 4,490,204 * | 12/1984 | Benfield . |
| 4,564,407 | 1/1986 | Tsuruta . |
| 4,714,506 | 12/1987 | Yamashiro et al. . |
| 5,540,644 * | 7/1996 | Naraoka et al. ..................... 493/196 |
| 5,552,003 | 9/1996 | Hoover et al. . |
| 5,660,662 * | 8/1997 | Testone ............................... 156/145 |

* cited by examiner

Primary Examiner—Sam Chuan Yao
(74) Attorney, Agent, or Firm—Nixon & Vanderhye P.C.

(57) ABSTRACT

An apparatus for manufacturing packing material from a web material includes a folding member that folds the web material into a folded web, a longitudinal sealing assembly for sealing the longitudinal ends of the folded web material forming a continuous tube, and a lateral sealing assembly including a pair of lateral sealing rollers that effect staged lateral sealing of the continuous tube of the web material. Pressurized air is outlet after the longitudinal seal is formed and prior to forming the lateral seal. With this arrangement, air-filled pockets suitable for packing material can be readily formed for immediate use. The arrangement is compact in size and capable of producing packing material on demand and at a sufficient rate to satisfy immediate packing material needs.

10 Claims, 3 Drawing Sheets

APPARATUS AND METHOD FOR MANUFACTURING PACKING MATERIAL

BACKGROUND OF THE INVENTION

The present invention relates to an apparatus and method for manufacturing packing material and, more particularly, to an apparatus and method for manufacturing packing material that is compact in size and capable of producing packing material on demand and at a sufficient rate to satisfy multiple packing personnel needs on an immediate basis.

Packing material is needed in many different applications. In some installations where products are shipped on a daily basis, packing material is a critical element in a successful business operation. Often, large quantities of packing material must be kept on hand for such daily use, which encumbers valuable storage space.

It is therefore desirable to provide an apparatus and method for manufacturing packing material that is compact in size and capable of producing packing material on demand and at a sufficient rate to satisfy even large packing material needs. Devices and methods have been disclosed for on-site manufacturing of packing material. For example, U.S. Pat. No. 4,714,506 discloses a method for making a packing material from a web material. In the method, edges of the web material are heat-pressed to form a continuous cylindrical body. The cylindrical body is then heat-pressed at suitable intervals to obtain a plurality of substantially triangular-shaped hollow units connected in series. With this method, however, the intricate configuration required to form the triangular-shaped hollow units requires an increased number of moving parts and slows the manufacturing process.

A similar process is disclosed in U.S. Pat. No. 4,564,407. In this process, the web material is formed into a cylindrical shape and fusion bonded in the longitudinal direction by a longitudinal sealer. The cylindrical film is then fusion-bonded by a transverse sealer. The transverse sealer 16 consists of a pair of opposing stamping plates that converge on the cylindrical film to fusion-bond the cylindrical film into pockets. Similar to the device disclosed in the '506 patent, the transverse sealer according to the '407 patent requires the stamping plates to be constantly moved toward and away from each other to effect sealing, and the cylindrical film must be fed at a rate slow enough or even temporarily stopped to give the sealer 16 sufficient time to perform the fusion bond.

SUMMARY OF THE INVENTION

It is therefore an object of the present invention to provide a method and apparatus for manufacturing packing material from a web material that overcomes the disadvantages of the prior art. It is another object of the invention to provide an apparatus and method for manufacturing packing material that is compact in size and capable of producing packing material on demand and at a sufficient rate to satisfy packing needs on an immediate basis.

These and other objects of the invention are achieved by providing an apparatus for manufacturing packing material from a web material including a folding member folding the web material into a folded web such that longitudinal ends of the web material are oriented facing each other at one end of the folded web and a fold is oriented at another end of the folded web. The apparatus also includes a longitudinal sealing assembly disposed downstream of the folding member aligned with the one end of the folded web. The longitudinal sealing assembly seals the longitudinal ends of the web material forming a continuous tube of the web material. The apparatus additionally includes a lateral sealing assembly disposed downstream of the longitudinal sealing assembly. The lateral sealing assembly includes a pair of lateral sealing rollers disposed in rotating engagement with each other. The lateral sealing rollers have staged sealing surfaces staged between 45°–180° apart that effect the lateral sealing of the continuous tube of the web material.

At least one of the staged sealing surfaces may include either a heating element, a serrated edge, and/or a cutting edge. The longitudinal sealing assembly preferably includes first, second and third pairs of rollers in respective rolling engagement with each other. In operation, the first pair of rollers preferably pre-forms the folded web material for sealing by pulling the film taughtly over a forming guide or mandrel. The second pair of rollers preferably includes a heating element to effect longitudinal sealing of the longitudinal ends of the web material. Both the first pair of rollers and the second pair of rollers may include a grooved pattern that urges the web material downward.

The mandrel is preferably disposed between the folding member and the longitudinal sealing assembly. In one embodiment, the mandrel is hollow defining an air passage, wherein the apparatus further includes a source of pressurized air communicating with the air passage and an air outlet at an end of the air passage. The air outlet is disposed between the longitudinal sealing assembly and the lateral sealing assembly. A non-stick coating may be provided on the mandrel.

In accordance with another aspect of the invention, there is provided a method of manufacturing packing material from a web material. The method includes the steps of folding the web material into a folded web such that longitudinal ends of the web material are oriented facing each other at one end of the folded web and a fold is oriented at the other end of the folded web; sealing the longitudinal ends of the web material forming a continuous tube of the web material; and rotating the sealing rollers of the lateral sealing assembly to contact the staged sealing surfaces and thereby effect staged lateral sealing of the continuous tube of the web material. The step of sealing the longitudinal ends of the web material is preferably practiced by pre-forming the web material for sealing, heat sealing the longitudinal ends of the web material, and setting the seal. The setting is preferably practiced by providing a closing force to the seal, evening the seal, and cooling the seal.

In accordance with still another aspect of the invention, there is provided a lateral sealing assembly for effecting lateral sealing of a continuous tube of web material. The lateral assembly includes a pair of lateral sealing rollers disposed in rotating engagement with each other and having staged sealing surfaces effecting staged lateral sealing of the continuous tube. In this context, each of the lateral sealing rollers preferably includes an upper ring and a lower ring in rotating engagement with a corresponding upper ring and lower ring of the other lateral sealing roller; and at least one sealing panel disposed between the upper ring and the lower ring, which sealing panel defines the staged sealing surfaces.

BRIEF DESCRIPTION OF THE DRAWINGS

These and other aspects and advantages of the present invention will be described in detail with reference to the accompanying drawings, in which.

DETAILED DESCRIPTION OF PREFERRED EMBODIMENTS

Figure 1:
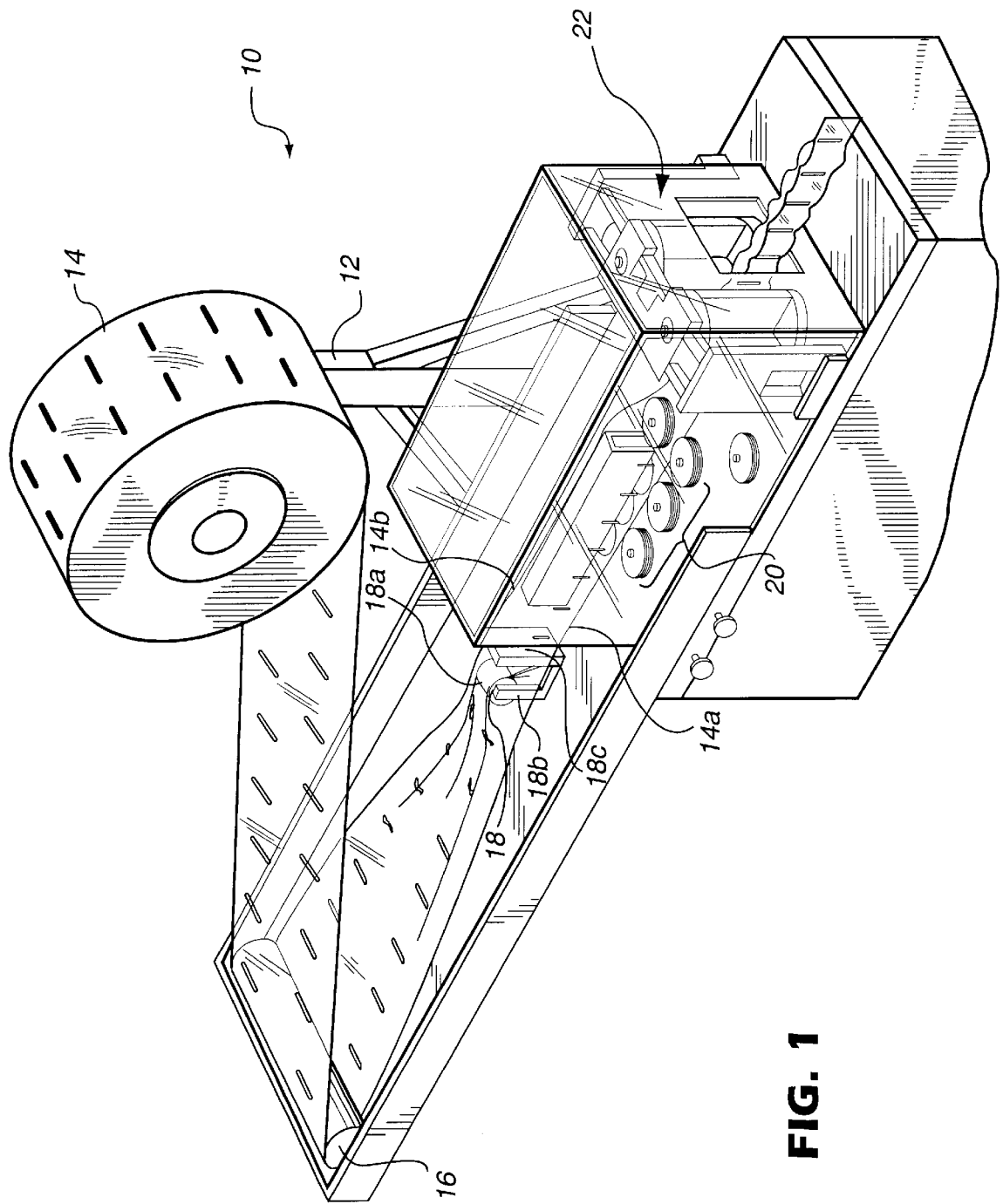
FIG. 1 is a perspective view of the packing material manufacturing apparatus according to the present invention.

FIG. 1 is a perspective view of the packing material manufacturing apparatus 10 according to the present invention in operation. The apparatus 10 includes a web material supporting assembly 12 supporting a roll of web material 14. The web material 14 is fed around a guide roller 16 and into the folding and sealing assemblies of the apparatus 10.

A folding member 18 is disposed downstream of the guide roller 16 and includes a folding member or roller 18a that folds the web material 14 into a folded web such that longitudinal ends 14a of the web material 14 are oriented facing each other at one end of the folded web (bottom end in FIG. 1), and a fold 14b is oriented at another end of the folded web (upper end in FIG. 1). The folding member 18a is fixed relative to the web material 14 by a suitable bracket 18b. A guide member 18c may be coupled with the bracket 18b to facilitate entry of the folded web into the sealing assemblies.

The folded web is then transferred to a longitudinal sealing assembly 20 disposed downstream from the folding member 18. The longitudinal sealing assembly 20 is aligned with the longitudinal ends 14a of the folded web and serves to seal the longitudinal ends of the web material forming a continuous tube.

A lateral sealing assembly 22 is disposed downstream of the longitudinal sealing assembly 20. The lateral sealing assembly effects spaced or staged lateral sealing of the continuous tube to form the final packing material product. An outlet for a source of pressurized air (described below) is disposed between the longitudinal sealing assembly 20 and the lateral sealing assembly 22 for injecting pressurized air into the continuous tube prior to the staged lateral sealing by the lateral sealing assembly 22. The final packing material product thus consists of sealed pillow packets of the web material filled with pressurized air.

Figure 2:
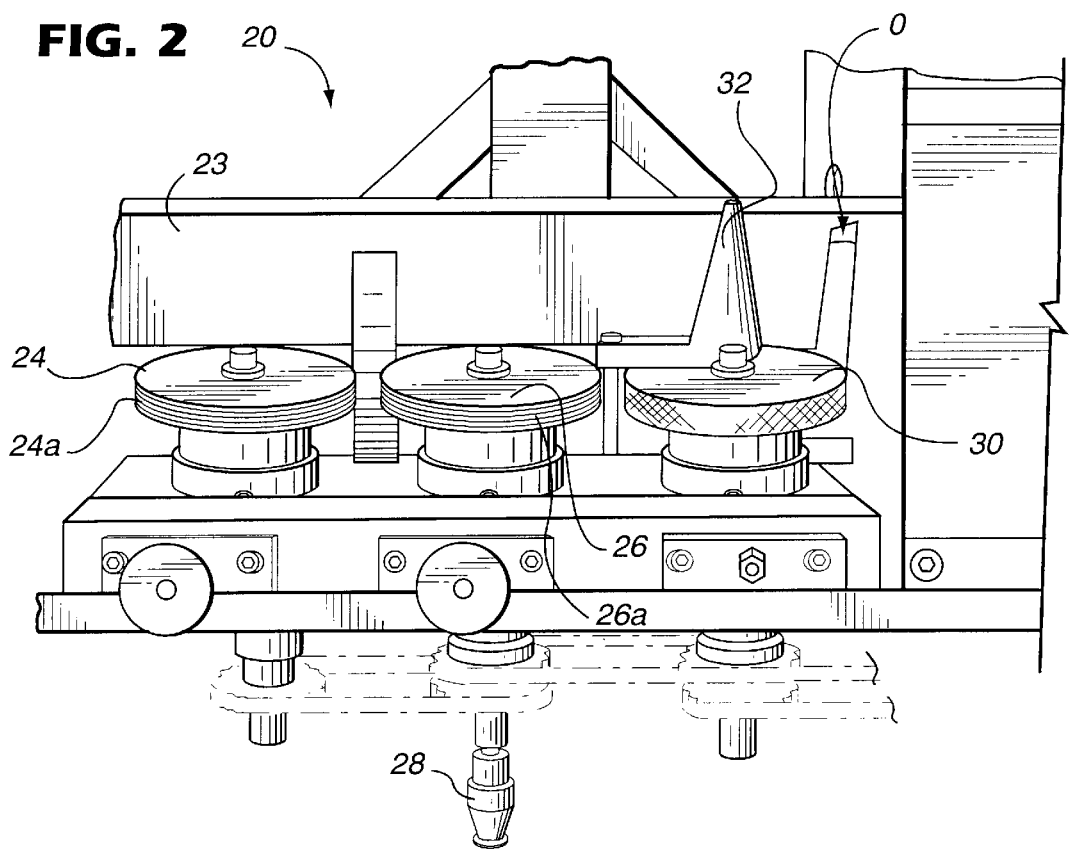
FIG. 2 is a close-up view of the longitudinal sealing assembly.

FIG. 2 is a close-up view of the longitudinal sealing assembly 20. The longitudinal sealing assembly 20 includes three pairs of rollers, one of each pair being shown in FIG. 2. Each of the rollers is held in respective rolling engagement with the other roller of the pair. A hollow mandrel 23 is also shown in FIG. 2. The rollers are engaged with the other respective rollers in the pair beneath the mandrel 23.

The first pair of rollers 24 serves to pre-form the folded web material for longitudinal sealing. The rollers 24 are provided with grooves 24a having a slight helix angle that pull the material taughtly over the mandrel 23. By pre-forming the folded material prior to longitudinal sealing, the longitudinal sealing process can be performed at considerably higher speed.

A second pair of rollers 26 is disposed downstream from the first pair of rollers 24. The second rollers 26 are heated to a temperature between 230° F.–250° F. and preferably about 240° F. to continuously heat seal the material. The second rollers 26 are similarly provided with a grooved perimeter 26a to urge the material downwardly over the mandrel 23. A heating element 28 is inserted through the gear train of the driving system (described below) to effect heating of the rollers 26. The heating element 28 is comprised of any suitable structure for the intended purpose. In preferred forms, the heating element 28 is a conventional resistive element.

A third pair of rollers 30 is disposed downstream from the second pair of rollers 26. The third rollers 30 serve to set the seal by providing a closing or crushing force to ensure that no air pockets exist in the sealed area. The third rollers 30 also remove heat so that the film may be used as a packing material within about one minute after exiting the machine.

One or more guides 32 are secured adjacent the mandrel 23 to maintain the position of the web material during sealing. The mandrel 23 is preferably coated with a non-stick material such as silicon to facilitate sliding of the web material over the mandrel during the longitudinal sealing process.

Figure 4:
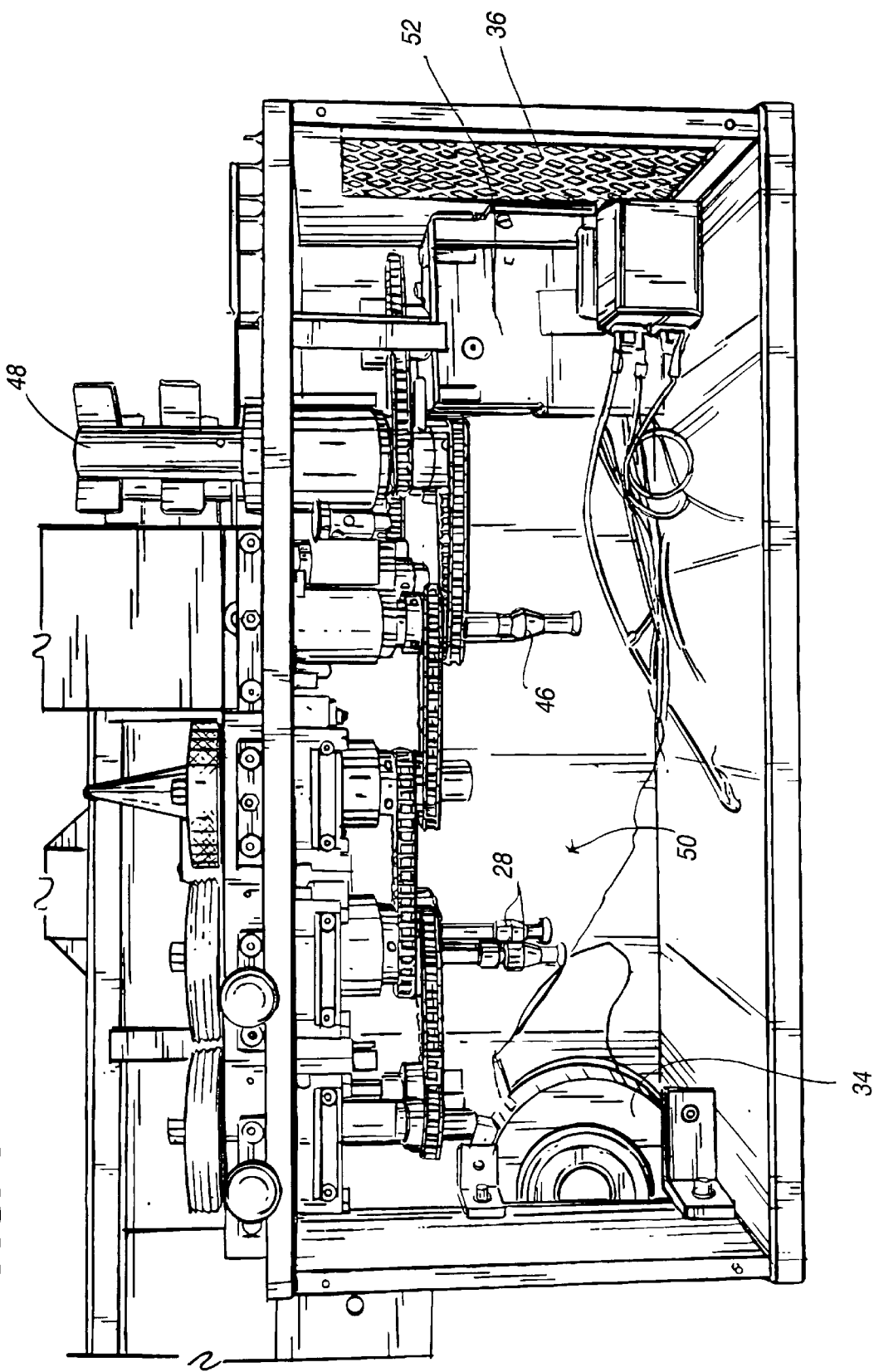
FIG. 4 is a side view of the apparatus illustrated in FIG. 1, showing the driving components of the apparatus according to the present invention.

As shown in FIG. 4, a small motor or cooling fan 34 such as, for example, a 20 cfm wheel type blower, draws cooling air through a mesh wall 36 on the device for cooling the driving components of the apparatus. The cooling fan 34 outputs pressurized air into an air chamber inside of the hollow mandrel 23. The pressurized air is output at location O noted in FIG. 2 downstream of the longitudinal sealing assembly 20. Thus, after completion of the longitudinal seal, the pressurized air is input into the continuous tube formed by the longitudinal sealing assembly 20.

Figure 3:
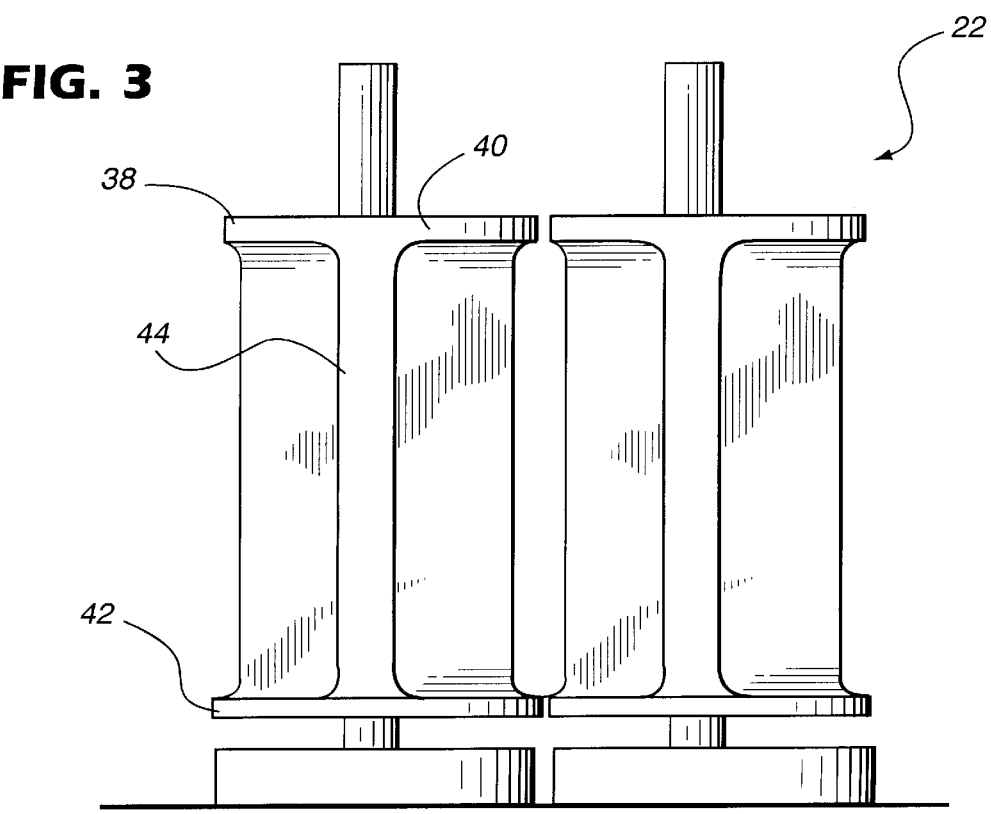
FIG. 3 is a close-up view of the lateral sealing assembly.

Referring to FIG. 3, the air-filled continuous tube of web material is then fed to the lateral sealing assembly 22. The lateral sealing assembly 22 includes a pair of lateral sealing rollers 38 each having an upper ring 40 and a lower ring 42 disposed in rotating engagement with a corresponding upper ring and lower ring of the other lateral sealing roller 38. (The rollers 38 in FIG. 3 are shown spaced for clarity of understanding. In operation, the upper rings 40 and lower rings 42 are disposed in substantial engagement with each other, respectively.)

One or more sealing panels 44 are disposed between the upper ring 40 and the lower ring 42 of each sealing roller 38. These sealing panels 44 define staged or spaced sealing surfaces that effect staged lateral sealing of the continuous tube of the web material. That is, the sealed continuous tube of the web material is guided between the lateral sealing rollers 38 of the lateral sealing assembly 22, and as the lateral sealing rollers 38 rotate, the staged sealing surfaces 44 meet at predetermined staged intervals and urge the sides of the continuous tube of the web material toward each other. The staged sealing surfaces 44 are heated to about 240° F. and provide the sealing force and temperature to form an air barrier from one sealed pocket to the next. As shown in FIG. 4, a heating element 46 is coupled to the lateral sealing rollers 38 through the gear drive mechanism.

The sealing panels may be spaced or staged between 45° and 180° apart, depending on the desired end product. That is, if there are more sealing surfaces (i.e., staged at a lower degree angle apart), a larger number of smaller pockets will result; and if there are a lesser number of sealing surfaces (i.e., staged at a larger degree angle apart), a lesser number of larger pockets will result. One or more of the staged sealing surfaces may additionally or alternatively comprise a serrated edge to effect perforation of the packing material. In similar context, one or more of the staged sealing surfaces may additionally or alternatively include a cutting edge to effect cutting of the packing material. After sealing, as shown schematically in FIG. 1, the resulting packing material product consists of a train of air-filled plastic pockets that are ready for use. As shown in FIG. 4, the device may also be provided with pulling rollers 48 that maintain the profile of the packing material for the lateral sealing process and facilitate removal of the finished packing material to an out-of-the-way location.

FIG. 4 illustrates an exemplary driving system for the apparatus according to the present invention. It is noted that any suitable driving system can be used to effect the operation described above. As shown, the driving system 50 includes a gear train driven by a single motor 52. A preferred motor is a parallel shaft gear motor developing 50 inch pounds of torque to the drive gear train arrangement With this configuration, the relative speed of the system assemblies are controlled by a single motor and can be more easily adjusted. A preferred speed of operation is about 50 ft./min. output, based on a compromise between the melt temperatures and the dwell times needed by the cross seal rollers to form a reliable, air-tight seal. Operating speeds may vary between 40–70 ft./min., however, faster speeds require lower melt temperatures or higher heater temperatures.

The apparatus is also provided with a suitable control system that enables the user to designate the desired number of pockets or length of packing material. The user can also control sealing temperature and pressurized airflow. Those of ordinary skill in the art will readily contemplate the application of a control system for the motor and heater unit of the invention, which control system does not form a part of the invention described herein. The details of the control system will therefore not be further described. The control system can interact with a hand-held controller or a panel mounted directly on the apparatus or at a remote location. The controls may incorporate a sleep function that keeps the device ready to produce packing materials within two to three minutes. The sleep function keeps the heated surfaces at a lower temperature such as about 150° F. until the operator requires packing materials at which time the heated surfaces return to a required temperature range (about 240° F.). If no operation occurs after a defined period of time, the machine automatically returns to the sleep status.

The size of the pockets is adjustable based on the amount of space between the staged sealing surfaces. The lateral sealing assembly 22 can thus be readily replaced with replacement sealing rollers including sealing surfaces 44 that are staged at different angles. As an alternative, the size of the pockets may be controlled by the back tension on the roll, which can be increased or decreased by the friction of a small belt (not shown) tightened over the rotating roll center hub. The height of the pocket can be controlled by changing the mandrel 23 and using a wider film material.

In preferred forms, the web material is a three-ply polymer film consisting of low density polyethylene, nylon, and a low density polyethylene of a higher melt value for the outside layer. The material is a sandwich structure and can be a lamination or co-extrusion with polyethylene as the outside layer and nylon as the inside layers. The inside layer melts and seals at a temperature lower than the outside layer. The nylon provides an air barrier and adds to strength. The films are oriented such that the film is extremely robust, resulting in pockets that are puncture resistant and support approximately 50 psi in a packing situation.

With the web material, any combination of polymers is possible so long as the outer layer is sufficiently heat resistant and can transmit the heat through its layer to the inside layers causing the inside layers to melt and fuse, forming an air tight seal. The film can be engineered depending on end use application in order to support external pressure for an extended period of time and maintain the cushion effect. A preferred embodiment includes an internal nylon film as an air barrier. Other applications may require films of a different nature, including electrically conductive films to be used in anti-static applications.

By virtue of the structure according to the invention, an efficient and compact apparatus is provided for manufacturing packing material from a web material. The apparatus is particularly suited for on-site manufacture of packing material, which is readily usable within one or two minutes of manufacture. By virtue of the lateral sealing assembly including lateral sealing rollers, the number of moving parts is minimized and the manufacturing speed is maximized as the lateral sealing roller need not move with the continuous tube of the web material for a distance and time sufficient to achieve the proper seal, and the continuous tube of the web material need not be temporarily stopped to effect sealing.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method of manufacturing packing material from a web material with an apparatus including a lateral sealing assembly having a pair of sealing rollers including staged heat-sealing surfaces and a longitudinal sealing assembly having first, second and third pairs of rollers in respective rolling engagement with each other, the method comprising:
   (a) folding the web material into a folded web such that longitudinal ends of the web material are oriented facing each other at one end of the folded web and a fold is oriented at another end of the folded web;
   (b) sealing the longitudinal ends of the web material forming a continuous tube of the web material by (b1) pre-forming the web material for sealing with the first pair of rollers, (b2) heat sealing the longitudinal ends of the web material with the second pair of rollers, and (b3) setting the seal with the third pair of rollers; and
   (c) disposing the sealing rollers of the lateral sealing assembly in constant rolling engagement with each other and rotating the sealing rollers to contact the staged heat-sealing surfaces and thereby effect heated staged lateral sealing of the continuous tube of the web material.

2. A method according to claim 1, wherein step (b3) is practiced by providing a closing force to the seal, evening the seal, and cooling the seal.

3. A method according to claim 1, wherein step (b1) is practiced by pulling the web material tautly over a forming guide.

4. A method according to claim 3, further comprising, after step (b) and before step (c), the step of flowing pressurized air through the forming guide and filling the continuous tube of the web material with the pressurized air.

5. A method according to claim 1, further comprising, after step (b) and before step (c), the step of filling the continuous tube of the web material with pressurized air.

6. A method of manufacturing packing material from a web material, the method comprising:
   (a) folding the web material into a folded web such that longitudinal ends of the web material are oriented facing each other at one end of the folded web and a fold is oriented at another end of the folded web;
   (b) providing a longitudinal sealing assembly having first, second and third pairs of rollers in respective rolling engagement with each other, and sealing with the longitudinal sealing assembly the longitudinal ends of the web material forming a continuous tube of the web material by (b1) pre-forming the web material for sealing with the first pair of rollers, (b2) heat sealing the longitudinal ends of the web material with the second pair of rollers, and (b3) setting the seal with the third pair of rollers; and (c) providing a lateral sealing assembly including a pair of lateral sealing rollers disposed in constant rotating engagement with each other and having staged heat-sealing surfaces, and rotating the lateral sealing rollers to contact the staged heat-sealing surfaces and to thereby effect heated staged lateral sealing of the continuous tube of the web material.

7. A method according to claim 6, wherein step (b3) is practiced by providing a closing force to the seal, evening the seal, and cooling the seal.

8. A method according to claim 6, wherein step (b1) is practiced by pulling the web material tautly over a forming guide.

9. A method according to claim 8, further comprising, after step (b) and before step (c), the step of flowing pressurized air through the forming guide and filling the continuous tube of the web material with the pressurized air.

10. A method according to claim 6, further comprising, after step (b) and before step (c), the step of filling the continuous tube of the web material with pressurized air.

* * * * *